No. 877,809.

PATENTED JAN. 28, 1908.

B. B. TURNER.
SASH FASTENER.
APPLICATION FILED FEB. 4, 1907.

2 SHEETS—SHEET 1.

Witnesses
G. R. Thomas
F. B. MacNab

Inventor
B. B. Turner
By
Attorneys

No. 877,809. PATENTED JAN. 28, 1908.
B. B. TURNER.
SASH FASTENER.
APPLICATION FILED FEB. 4, 1907.
2 SHEETS—SHEET 2.
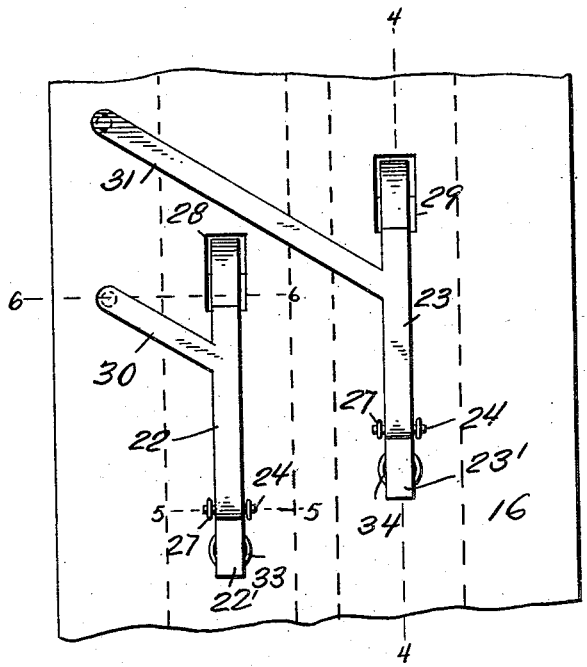
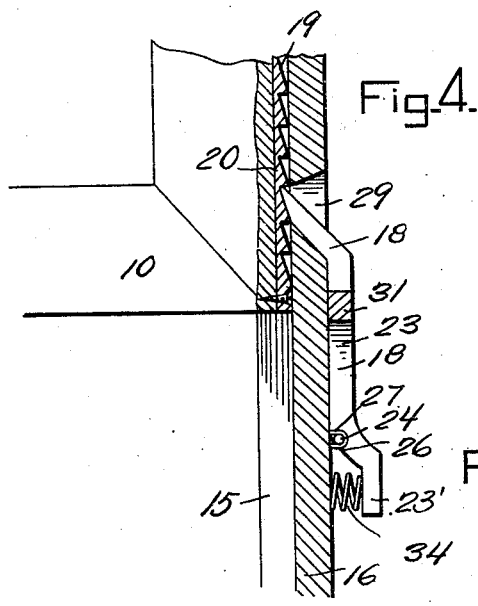
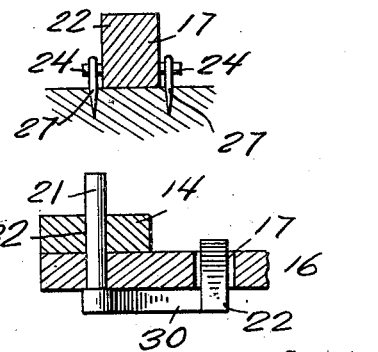
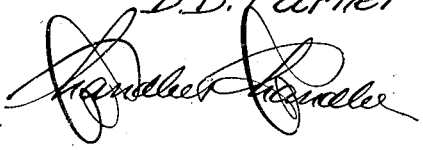

UNITED STATES PATENT OFFICE.

BEVERLY B. TURNER, OF BERTHOUD, COLORADO.

SASH-FASTENER.

No. 877,809.　　　Specification of Letters Patent.　　　Patented Jan. 28, 1908.

Application filed February 4, 1907. Serial No. 355,761.

*To all whom it may concern:*

Be it known that I, BEVERLY B. TURNER, a citizen of the United States, residing at Berthoud, in the county of Larimer, State of Colorado, have invented certain new and useful Improvements in Sash-Fasteners; and I do hereby declare the following to be a full, clear, and exact description of the invention, such as will enable others skilled in the art to which it appertains to make and use the same.

This invention has relation to that kind or class of window sash stops and fasteners that are provided to save the application of weights, cords and pulleys and stops the trouble and expense of their use, to maintain the sashes at any desired elevation.

Contrivances for the purpose mentioned are usually employed on the window-jamb in the plane of the meeting rails of the sashes, and comprise spring-actuated catches or stops that engage a rack or racks, variously constructed, connected with the edge sash to hold the latter in position, as stated.

It is the object of my invention to provide improvements that will be exceedingly economic of construction and ready for application and use, and that will hold the sashes firmly at any elevation, while being placed out of the way of being damaged in the operation of the sashes, or disfiguring the window finishing to any appreciable extent.

The nature of the invention is fully ascertainable from the contrivances portrayed in the annexed drawings, forming a part of this specification, in view of which the improvements will first be described with respect to construction and mode of operation and then be pointed out in the subjoined claims.

Figure 1:
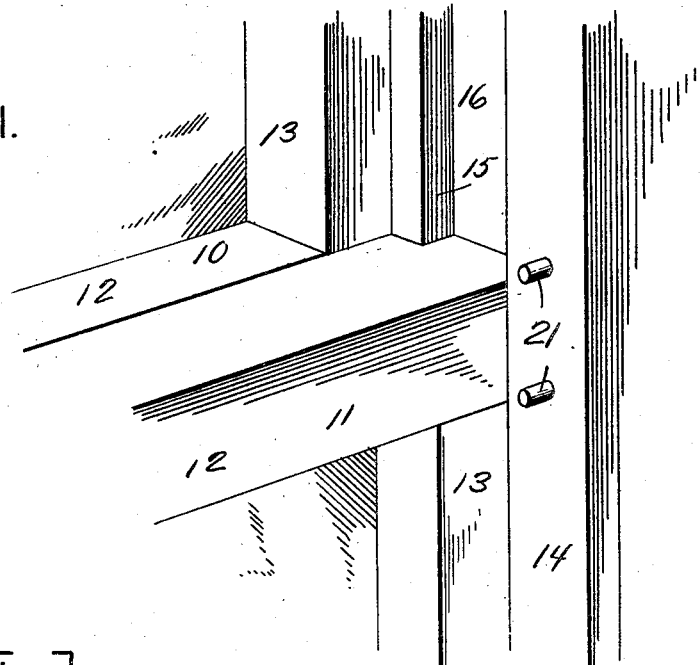
Figure 2:
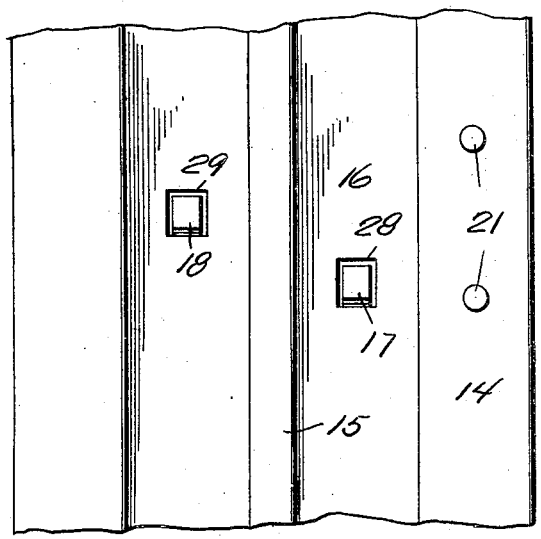
Figure 7:
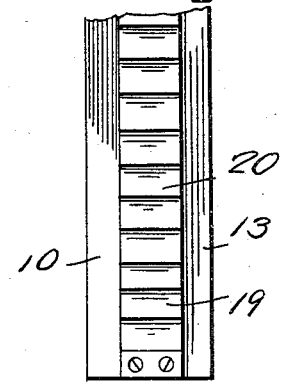

Of the said drawings—Figure 1 is an inside perspective view of a portion of a window and its casing at the point of the meeting rails of the sashes, showing all that is to be seen of my improvements when the windows are closed. Fig. 2 is a face or front view of the portion of the window-jamb with my improvements applied thereto, the sashes being removed. Fig. 3 is a rear view of the portion of the jambs shown in Fig. 2. Fig. 4 is a vertical sectional view in the plane 4 4, Fig. 3. Fig. 5 is a transverse sectional view in the plane 5 5, Fig. 3. Fig. 6 is a sectional detail in the plane 6 6, Fig. 3. Fig. 7 is an edge view of a portion of a window-sash provided with a rack-bar for engagement by the dogs of my improved sash-holder.

Similar numerals of reference designate similar parts or features, as the case may be, wherever they occur.

In the drawings, 10 designates the upper, and 11 the lower sashes of a window, 12 being the so-called meeting rails, and 13 the side rails. The usual side stops 14 and parting-bead 15 are secured to the window-jamb 16 affording guideways for the movement up and down of the sashes.

In Fig. 2 I have shown a face view of the jamb back of which my improvements are located, the point being substantially in the plane of the meeting rails of the sashes, and substantially all that is visible in the view stated being the ends of the dogs 17 and 18 that are adapted to engage the notches 19 of the rack 20 in the sides of the sash frames, and the projecting ends of the push studs or knobs 21.

The main portion of the improved device is located in a recess or space back of the jamb and consists of the fingers 22 and 23, having upwardly offset lower ends 22' and 23' and laterally projecting pins 24 at each side of the bosses 26 over which staples 27 are arranged and driven into the jamb so as to pivot the fingers on the latter. The upper ends of the fingers 22 and 23 are provided with the dogs 17 and 18, respectively, which project inclinedly upward through holes 28 and 29.

30 and 31 designate bars connected at their inner ends with the fingers 22 and 23 respectively, and at their outer ends with the upper end portion of the push studs or knobs 21 projecting through the holes 32 formed in the jamb.

33 and 34 designate springs secured under the offset lower ends 22' and 23' and bearing upward on the same to normally hold the dogs 17 and 18 pressed forward into engagement with the rack-bar of the window sash.

By inclining the dogs of the fingers 22 and 23 upward they are better enabled to catch and hold the rack-bars of the sashes than though they projected horizontally.

It hardly needs explanation to establish the fact that by pressing on the push-studs 21, they will cause the fingers and dogs to move back against the stress of the springs 33 and 34 acting thereon, and thus disengage the dogs from the notches of the rack-bars. The bars which connect the push-studs with the fingers are inclined upwardly and laterally so as to bring the outer ends of the studs through openings in the inside stop of the lower sash at a convenient position as represented in Fig. 1.

It is to be noted that the invention forms a secure catch for both sashes of the window at any height to which they may be raised or point to which they may be lowered, and that save for the ends of the push-studs it is completely out of sight from the inside of the closed window.

The invention is economically applied as well as being of low cost of construction. Other points of advantage, such as durability, not easily put out of order, etc., are obvious.

The manner of operating the improvements have been so clearly indicated in describing the construction and application as not to require further mention.

What is claimed is:

The combination with a window casing, including the jamb, inner apertured side-stops, and the vertically movable sashes, of rack-bars secured to the outer edges of the sashes, vertically disposed spring-actuated fingers, one for each sash, pivoted on the inner side of the jamb and provided at their upper ends with upwardly inclined dogs to engage the rack-bars, the jamb having holes through which the dogs are adapted to operate, and a laterally inclined bar projecting from each arm, and provided with a stud projecting inward through the apertured side-stop.

In testimony whereof, I affix my signature, in presence of two witnesses.

BEVERLY B. TURNER.

Witnesses:
EMERY BASHOR,
ROBT. L. PULLIAM